United States Patent [19]

Uehira

[11] Patent Number: 4,460,935

[45] Date of Patent: Jul. 17, 1984

[54] INPUT PROTECTING CIRCUIT FOR A SEMICONDUCTOR CIRCUIT COMPONENT

[75] Inventor: Eiji Uehira, Kobe, Japan

[73] Assignee: Fujitsu Ten Limited, Kobe, Japan

[21] Appl. No.: 390,076

[22] Filed: Jun. 18, 1982

[51] Int. Cl.³ .............................................. H02H 9/04
[52] U.S. Cl. ........................................ 361/91; 357/23
[58] Field of Search ................. 361/56, 91, 110, 111; 357/23 GP

[56] References Cited

U.S. PATENT DOCUMENTS 4,390,919  6/1983  Lesinski .............................. 361/56

OTHER PUBLICATIONS

"Overvoltage Protection for Driver Circuits"–Bidendorf et al., IBM Technical Disclosure Bulletin, vol. 17, No. 11, pp. 3289–3291, 4/75.

Ryoji Gamo, "Anarogu-Kairo No Toraburu Taisaku", (How to Cope with Problem of Analogue Circuit), Tokyo: CQ Shuppan Kabushiki Kaisha, 1977, pp. 188–190.

Primary Examiner—Harry E. Moose, Jr.
Attorney, Agent, or Firm—Wenderoth, Lind & Ponack

[57] ABSTRACT

An input protecting circuit for a semiconductor circuit component having an input terminal, which is powered by a direct current power source, is provided with a series circuit having a first diode connected in series with a biasing element, the series being connected across the direct current power source. The first diode is forward-coupled. A second diode is further provided the second diode being reversely-coupled between a junction of the first diode and the biasing element, and the input terminal of the semiconductor circuit component. This input protecting circuit operates so as to prevent a signal level at the input terminal from being greater than the supply voltage of the direct current power source. An additional first diode and second diode may be provided, the additional first diode being in the series circuit and the additional second diode being associated with the biasing element so as to prevent a positive or negative input signal from being greater than the supply voltage.

4 Claims, 4 Drawing Figures

INPUT PROTECTING CIRCUIT FOR A SEMICONDUCTOR CIRCUIT COMPONENT

BACKGROUND OF THE INVENTION

1. Field of the Invention

The present invention relates to an input protecting circuit for a semiconductor circuit component such as an integrated circuit, microcomputer and so on, and particularly to a circuit for protecting the semiconductor circuit component from damage by a surge or noise spike which is supplied to an input of the semiconductor circuit component, and which has a positive or negative voltage which is higher than the supply voltage from a direct current power source.

2. Description of the Prior Art

An input protecting circuit is required for use with semiconductor circuit components installed in an automobile. An ignition coil used in a spark ignition internal combustion engine of the automobile tends to induce a surge noise having a positive or negative voltage at an input terminal of the semiconductor circuit components and thus, catastrophic damage to the semiconductor circuit components may result. Thus, it is apparent that an input protecting circuit must be provided to prevent the surge noise from being supplied to the semiconductor circuit components.

Referring now to FIG. 1, there is shown a typical prior art circuit. A semiconductor circuit component 1 such as an integrated circuit, a microcomputer and so on is powered by a direct current power source 2. A signal generating circuit 3 which may be a circuit for detecting the velocity of an automobile supplies an output signal via line 6, a resistor 8 and a junction 4 to an input terminal P of the semiconductor circuit component 1. In the case where a surge signal having a higher positive voltage overlaps the output signal from the signal generating circuit 3, a current path is provided from the input terminal P through the junction 4, a diode 5 and the direct current power source 2 to a line 7. This results in the voltage of the junction 4 and thus the input terminal P being enhanced by a forward voltage drop V5 of the diode 5 from the voltage V2 of the direct current power source 2.

In the case where a surge signal having a negative voltage appears in the output signal from the signal generating circuit 3, current flows from the line 7 via a diode 9, the junction 4 and the resistor 8 to the line 6. As a result, the voltage of the junction 4 and thus the input terminal P is reduced by a forward voltage drop V9 of the diode 9 from the voltage of the line 7.

Eventually the input terminal P of the semiconductor circuit component 1 receives a signal having a higher voltage level than that of the direct current power source 2 or a lower negative voltage level than that of the ground level. Consequently, the semiconductor circuit component 1 operates improperly. In brief, therefore, the prior art technique has suffered from the application of a signal to the input terminal P of the semiconductor circuit component 1 having a higher voltage level than that of the supply voltage of the direct current power source 2 or a lower negative voltage level than that of the ground level, thereby causing destructive damage.

SUMMARY OF THE INVENTION

An object of the present invention is to provide an input protecting circuit for preventing a signal having a higher voltage level than that of the supply voltage of the direct current power source or a lower negative voltage level than that of the ground level from being supplied to an input terminal of a semiconductor circuit component.

Other objects and advantages of the invention will become apparent from the following detailed description and the accompanying drawings.

The input protecting circuit which forms the subject of the invention protects a semiconductor circuit component having an input terminal, which is powered by a direct current power source, and which includes a series circuit. The series circuit is connected across the direct current power source and has a first diode connected in series with a biasing element. The first diode is forward-coupled. A second diode which is reversely coupled between a junction of the first diode and the biasing element, and the input terminal of the semiconductor circuit component is also provided.

By means of this arrangement, the application of a signal to the input terminal of the semiconductor circuit component having a voltage which is greater than a that of the supply voltage of the direct current power source is avoided, and the voltage level of the input terminal is equal to or less than the supply voltage of the direct current power source. This insures that the semiconductor circuit component operates in an ordinary manner.

In an preferred embodiment of the subject invention, the series circuit includes an additional first diode. The biasing element is interposed between these two first diodes, that is, there are arranged one first diode, the biasing element and the other first diode connected in this order. An additional second diode is also provided. Each of second diodes is connected between the junction of the first diode corresponding to the second diode individually and the biasing element, and the input terminal of the semiconductor circuit component. This arrangement does not allow the voltage at the input terminal of the semiconductor circuit component to be a higher voltage level than that of the supply voltage of the direct current power source or a lower negative voltage level than that of the ground level when a positive or negative surge noise is present.

Biasing element may be implemented by a resistor, a constant current source, a transistor coupled in a forward direction, etc.

BRIEF DESCRIPTION OF THE DRAWINGS

A detailed description of the invention will be made with reference to the accompanying drawings wherein like numerals designates elements in the several figures.

DESCRIPTION OF THE PREFERRED EMBODIMENTS

The following detailed description is of the best presently contemplated modes of carrying out the present invention. This description is not to be taken in a limiting sense, but is made merely for the purpose of illustrating the general principles of the invention, since the scope of the invention is best defined by the appended claims.

Figure 1:
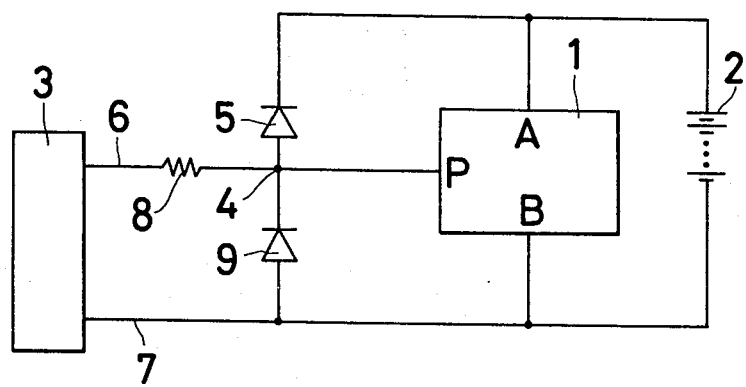
FIG. 1 is a schematic diagram of a prior art circuit.
Figure 2:
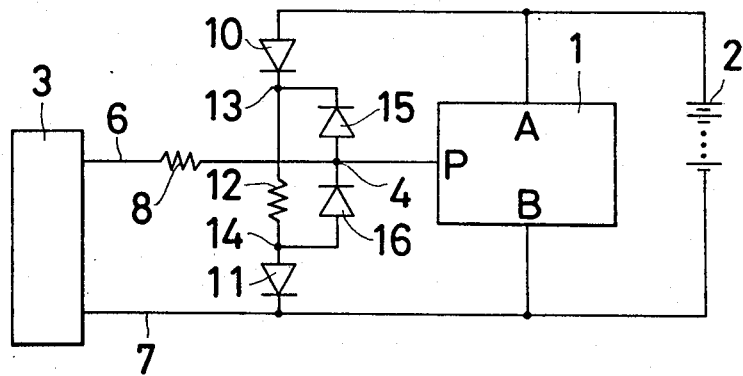
FIG. 2 is a schematic diagram of an input protecting circuit embodying one concept of the invention.

Referring now to FIG. 2, there is shown an input protecting circuit for a semiconductor circuit component 1 according to an aspect of the present invention. A semiconductor circuit component 1 such as an integrated circuit, a microcomputer and so on is powered by a direct current power source 2. A series circuit comprising first diodes 10 and 11, and a resistor 12 referred to as a biasing element interposed between the diodes 10 and 11 is provided. This series circuit including the diodes 10 and 11 and the resistor 12 is coupled across the output terminals of the direct current power source 2. These diodes 10 and 11 are coupled in a forward direction. Two second diodes 15 and 16 which are associated with the first diodes 10 and 11 and the resistor 12 are provided corresponding to the first diodes 15 and 16 individually. The diode 15 has a cathode connected to a junction 13 of the diode 10 and the resistor 12, and has an anode connected to an input terminal P of the semiconductor circuit component 1 at a junction 4. An anode of the diode 16 is connected to the junction 14 of the diode 11 and the resistor 12. A cathode of the diode 16 is connected to the junction 4. A signal generating circuit 3 supplies a signal to the terminal P via a line 6 and a resistor 8. In this fashion, each of the first diodes 10 and 11 has a reverse polarity with respect to the second diodes 15 and 16. The diodes 10, 11, 15 and 16 have forward voltage drops V10, V11, V15 and V16 individually, which are substantially equal to each other. The resistor 12 serves as a biasing element to cause the diodes 10 and 11 to turn on so as to derive an appropriate forward voltage drop.

In the case where a positive high voltage surge noise is applied to the line 6 from the signal generating circuit 3, a current path is provided from the line 6 through the resistor 8, the junction 4, the diode 15, the junction 13, the resistor 12, the junction 14 and the diode 11 to the line 7; therefore, a voltage V13 at the junction 13 is reduced by forward voltage drop V10 of the diode 10 from the source voltage V2 of the direct current power source 2.

$$V13 = V2 - V10 \quad (1)$$

As a result, a voltage VP of the junction 4 and the input terminal P exceeds the voltage of the junction 13 by a forward direction voltage drop V15 of the diode 15.

$$VP = (V2 - V10) + V15 \quad (2)$$
$$= V2$$

Accordingly, the voltage of the junction 4 and the input terminal P is kept equal to or less than the supply voltage V2 of the direct current power source 2 even when the positive high voltage surge noise is applied to the line 6.

Let us assume that a negative surge noise is present on the line 6 from the signal generating circuit 3. In this case, a current path is provided from the line 7 through the direct current power source 2, the diode 10, the junction 13, the resistor 12, the diode 16, the junction 4 and the resistor 8 to the line 6. Therefore, the junction 14 is at a voltage level which is greater by a forward voltage drop V11 of the diode 11 than the voltage V7 of the line 7.

$$V14 = V7 + V11 \quad (3)$$

The voltage V4 of the junction 4 is reduced by a forward voltage drop V16 of the diode 16 from the voltage of the junction 14.

$$V4 = (V7 + V11) - V16 \quad (4)$$
$$= V7$$

This prevents the voltage level at the junction 4 and thus the input terminal P from being lower than the voltage of the line 7.

Figure 3:
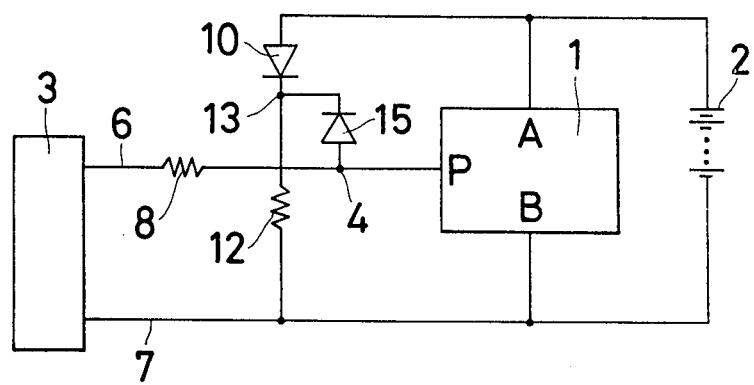
FIG. 3 is a schematic diagram of another embodiment of the inventive input protecting circuit.

Referring to FIG. 3 there is shown another preferred embodiment according to another aspect of the invention, wherein the diodes 11 and 16 shown in FIG. 2 are eliminated and the resistor 12 is connected directly to the line 7 so as to avoid the application of the abnormal high voltage noise to the input terminal P of the semiconductor circuit 1.

Figure 4:
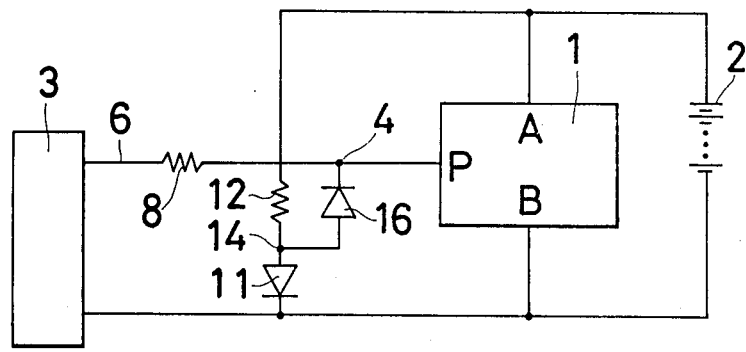
FIG. 4 is a schematic diagram of still another embodiment in accordance with the invention.

FIG. 4 shows a still further input protecting circuit according to the invention, wherein the diodes 10 and 15 shown in FIG. 2 are eliminated. This arrangement prevent the abnormal negative voltage noise from being applied to the input terminal P.

It should be point out that although, in the arrangement of FIG. 2, there is provided the resistor 12 as a biasing element, according to another aspect of the invention a constant current source, a transistor coupled in a forward direction and so on may be employed in place of the resister 12.

What is claimed is:

1. An input protecting circuit for a semiconductor circuit component having an input terminal and powered by a direct current power source, comprising:
    a series circuit having a first diode connected in series with a biasing element, said series circuit being across said direct current power source, said first diode being forward-coupled, and
    a second reversely-coupled diode connected between a junction of the first diode and the biasing element, and said input terminal of said semiconductor circuit component.

2. An input protecting circuit for a semiconductor circuit component as recited in claim 1, wherein said biasing element is a resistor.

3. An input protecting circuit for a semiconductor circuit component having an input terminal and powered by a direct current power source, comprising:
    a series circuit having a first diode connected in series with a biasing element, said series circuit being connected across said direct current power source, said first diode being forward-coupled, and a second reversely-coupled diode connected between a junction of said first diode and said biasing element, and said input terminal of said semiconductor circuit component;
    wherein said series circuit includes an additional first diode, said biasing element being interposed between said two first diodes, and wherein an additional second diode is provided, each of two second diodes being connected between the junction of said first diode corresponding to the second diode individually and said biasing element, and said input terminal of said semiconductor circuit component.

4. An input protecting circuit for a semiconductor circuit component as recited in claim 3, wherein said biasing element is a resistor.

* * * * *